United States Patent
Toyoizumi et al.

(10) Patent No.: US 10,277,585 B2
(45) Date of Patent: Apr. 30, 2019

(54) SERVER DEVICE, INFORMATION MANAGEMENT SYSTEM, INFORMATION MANAGEMENT METHOD, AND COMPUTER PROGRAM

(71) Applicant: A.T COMMUNICATIONS CO., LTD., Tokyo (JP)

(72) Inventors: Hiroshi Toyoizumi, Tokyo (JP); Youichi Azuma, Tokyo (JP); Tetsuya Takahashi, Tokyo (JP); Maya Takami, Tokyo (JP)

(73) Assignee: A.T COMMUMCATIONS CO., LTD., Tokyo (JP)

( * ) Notice: Subject to any disclaimer, the term of this patent is extended or adjusted under 35 U.S.C. 154(b) by 0 days.

(21) Appl. No.: 15/575,329

(22) PCT Filed: Jul. 21, 2015

(86) PCT No.: PCT/JP2015/070753
§ 371 (c)(1),
(2) Date: Nov. 17, 2017

(87) PCT Pub. No.: WO2017/013752
PCT Pub. Date: Jan. 26, 2017

(65) Prior Publication Data
US 2018/0145962 A1    May 24, 2018

(51) Int. Cl.
*H04L 29/06* (2006.01)
*G06F 21/62* (2013.01)
(Continued)

(52) U.S. Cl.
CPC ........ *H04L 63/083* (2013.01); *G06F 17/2217* (2013.01); *G06F 21/30* (2013.01);
(Continued)

(58) Field of Classification Search
CPC ......... G06F 21/30; G06F 21/62; H04L 63/083
See application file for complete search history.

(56) References Cited

U.S. PATENT DOCUMENTS

| | | | | | |
|---|---|---|---|---|---|
| 5,699,524 | A | * | 12/1997 | Ooishi | G06F 17/2217 358/1.15 |
| 5,890,183 | A | * | 3/1999 | Fujimoto | G06F 17/21 715/236 |

(Continued)

FOREIGN PATENT DOCUMENTS

| | | |
|---|---|---|
| EP | 2869210 A1 | 6/2015 |
| JP | 2006-106965 A | 4/2006 |

(Continued)

OTHER PUBLICATIONS

ISA/JP, International Search Report dated Oct. 27, 2015 in International Application No. PCT/JP2015/070753, total 4 pages with translation.

(Continued)

*Primary Examiner* — Dao Q Ho
(74) *Attorney, Agent, or Firm* — Masuvalley & Partners (57) ABSTRACT

A server device for safely managing information is configured to store prescribed character codes and converted character codes in correlation with each other, said server device being connected, via a network (N), to a terminal device for receiving a converted character code string corresponding to a character string indicating personal information stored in a storage unit device. Responsive to the reception of a prescribed character code string corresponding to a character string indicating an item included in the personal information by the terminal device, the server device converts each of prescribed character codes included in the prescribed character code string to a corresponding converted character code, thereby generating a converted character code string corresponding to the character string (Continued)

| Login ID | Password | Conversion Table | Conversion Font |
|---|---|---|---|
| abc@def.com | 12345 | Table0 | Font0 |
| ghi@jkl.com | 67890 | Table1 | Font1 |
| ⋮ | ⋮ | ⋮ | ⋮ |
| uvw@xyz.com | nopqr | Tablen | Fontn |
| ⋮ | ⋮ | ⋮ | ⋮ | indicating the item. The service device then commands the storage unit device to transmit the converted character code string corresponding to the character string indicating the personal information to the terminal device.

7 Claims, 9 Drawing Sheets

(51) Int. Cl.
*G09C 5/00* (2006.01)
*G06F 17/22* (2006.01)
*G06F 21/30* (2013.01)

(52) U.S. Cl.
CPC .......... *G06F 21/62* (2013.01); *G06F 21/6245* (2013.01); *G09C 5/00* (2013.01)

(56) References Cited

U.S. PATENT DOCUMENTS

| | | | | |
|---|---|---|---|---|
| 8,255,701 | B2 * | 8/2012 | Tao | ..................... G06F 21/6209 380/217 |
| 8,600,048 | B1 * | 12/2013 | Hansen | ................... G06F 21/62 380/28 |
| 2012/0260108 | A1 | 10/2012 | Lee | |

FOREIGN PATENT DOCUMENTS

| | | | |
|---|---|---|---|
| JP | 2007-272539 | A | 10/2007 |
| JP | 2009-294242 | A | 12/2009 |
| JP | 2010-244123 | A | 10/2010 |
| JP | 2010-257376 | A | 11/2010 |
| JP | 2011-133991 | A | 7/2011 |

OTHER PUBLICATIONS

EPO, Supplementary European Search Report dated Aug. 9, 2018 issued in European Patent Application No. 15898911.1, total 4 pages.

* cited by examiner

| Login ID | Password | Conversion Table | Conversion Font |
|---|---|---|---|
| abc@def.com | 12345 | Table0 | Font0 |
| ghi@jkl.com | 67890 | Table1 | Font1 |
| ⋮ | ⋮ | ⋮ | ⋮ |
| uvw@xyz.com | nopqr | Tablen | Fontn |
| ⋮ | ⋮ | ⋮ | ⋮ |

| Character | Prescribed character code | Converted character code |
|---|---|---|
| ⋮ | ⋮ | ⋮ |
| ! | 00201 | 12345 |
| " | 00202 | 67890 |
| ⋮ | ⋮ | ⋮ |

FIG. 6

00000 → ans9ewjdses3aexa
00001 → cmrfxcpxqpasdkfq3rx
00002 → mxjqwjfxaajrfcjwwrex
　　　⋮
　　　⋮
　　　⋮
65535 → eiu37sgcvjw4y8

SERVER DEVICE, INFORMATION MANAGEMENT SYSTEM, INFORMATION MANAGEMENT METHOD, AND COMPUTER PROGRAM

RELATED APPLICATIONS

This application is the U.S. National Phase application under 35 U.S.C. § 371 of International Patent Application No. PCT/JP2015/070753 filed on Jul. 21, 2015, entitled "SERVICE DEVICE, INFORMATION MANAGEMENT SYSTEM, INFORMATION MANAGEMENT METHOD, AND COMPUTER PROGRAM", which is hereby expressly incorporated by reference in its entirety for all purposes.

TECHNICAL FIELD

The present invention pertains to a server device, an information management system, an information management method, and a computer program, and more specifically, pertains to a server device, an information management system, an information management method, and a computer program which can securely manage information.

BACKGROUND OF DISCLOSURE

In recent years, leakage of personal information has become a major social problem, and various management systems have been developed to prevent the leakage of personal information (for example, see patent document 1: Japanese Unexamined Patent Application Publication No. 2006-106965). Note that in the present specification, the specification, claims, and all drawings of patent document 1 are incorporated as a reference.

SUMMARY OF THE INVENTION

However, with the sale management system described by patent document 1, personal information is stored as is in an information management server, and personal information is transmitted as is from the information management server to the sales terminal. Therefore, if a malicious hacker accesses the information management server, and intercepts communication from the information management server to the sales terminal, personal information is easily leaked.

Thus, the present invention was developed in order to solve the abovementioned problem, and an object thereof is to provide a server device, an information management system, an information management method, and a computer program which can securely manage information.

To achieve the abovementioned object, the server device (20) according to a first aspect of the present invention is provided with a storage unit (22) for correlating and storing a first character code and a second character code of a different type than the first character code; and a processor (23); and is connected via a network (N) to a terminal device (10) for receiving via the network (N) a second character code string corresponding to a first character string stored in a storage device (30); and in response to the reception from the terminal device (10) of the first character code string corresponding to a second character string contained in the first character string, the processor (23) converts the first character codes contained in the first character code string to the respectively corresponding second character codes, and thereby generates a second character code string corresponding to the second character string; and instructs the storage device (30) to transmit, to the terminal device (10), the second character code string corresponding to the first character string containing the second character code string corresponding to the second character string.

With the abovementioned server device (20), preferably, the processor (23) transmits, via the network (N), a font for displaying characters corresponding to the second character codes to the terminal device (10) satisfying prescribed conditions; and if the prescribed conditions are satisfied, the terminal device (10) uses the font transmitted from the server device (20), and displays the first character string, and if the prescribed conditions are not satisfied, the terminal device (10) displays a character string differing from the first character string.

With the abovementioned server device (20), preferably, the storage unit (22) correlates and stores the terminal device (10), the second character code, and the font; and the processor (23) converts the first character code to the second character code corresponding to the terminal device (10) that transmitted the first character code string containing the first character codes; and transmits the font corresponding to the terminal device (10) to the terminal device (10) satisfying the prescribed conditions.

With the abovementioned server device (20), preferably, the terminal device (10) destroys the font transmitted from the server device (20) if the prescribed conditions are not met.

With the abovementioned server device (20), preferably, the processor (23) converts the first character codes contained in the first character code string corresponding to the first character string to the respectively corresponding second character codes, and thereby generates a second character code string corresponding to the first character string; and instructs the storage device (30) to store, in the storage device (30), the second character code string corresponding to the first character string.

With the abovementioned server device (20), preferably, the second character codes are generated by respectively encrypting first character codes corresponding to each character to generate an encrypted character string, rearranging the encrypted character strings in a prescribed order, and sequentially assigning a numeric value to each character corresponding to the rearranged encrypted character string.

An information management system (1) according to a second aspect of the present invention is equipped with the abovementioned server device (20); and the terminal device (10), which uses the font transmitted from the server device (20) to display the first character string if the prescribed conditions are satisfied, and which displays a character string differing from the first character string if the prescribed conditions are not satisfied.

An information managing method according to a third aspect of the present invention, wherein information is managed through a server device (20) provided with a storage unit (22) for correlating and storing a first character code and a second character code of a different type than the first character code; and a processor (23); and connected via a network (N) to a terminal device (10) for receiving via the network (N) a second character code string corresponding to a first character string stored in a storage device (30); and in response to the reception from the terminal device (10) of the first character code string corresponding to a second character string contained in the first character string, the processor (23) converts the first character codes contained in the first character code string to the respectively corresponding second character codes, and thereby generates a second character code string corresponding to the second character string; and instructs the storage device (30) to transmit, to the terminal device (10), the second character code string corresponding to the first character string containing the second character code string corresponding to the second character string.

A computer program according to a fourth aspect of the present invention, wherein in response to the reception from the terminal device (10) of the first character code string corresponding to a second character string contained in the first character string, the computer program causes a processor (23) of the server device (20) to convert the first character codes contained in the first character code string to the respectively corresponding second character codes, and thereby generate a second character code string corresponding to the second character string; and to instruct the storage device (30) to transmit, to the terminal device (10), the second character code string corresponding to the first character string containing the second character code string corresponding to the second character string; the server device (20) thereof being provided with a storage unit (22) for correlating and storing a first character code and a second character code of a different type than the first character code; and the processor (23); and being connected via a network (N) to the terminal device (10) for receiving via the network (N) a second character code string corresponding to a first character string stored in the storage device (30).

According to the server device, information management system, information management method, and computer program of the present invention, information can be securely managed.

BRIEF DESCRIPTION OF THE DRAWINGS

The present disclosure is described in conjunction with the appended figures.

DETAILED DESCRIPTION OF THE INVENTION

A mode for carrying out the present invention is described below.

First, a configuration of the information management system according to the present embodiment is described with reference to the images.

Figure 1:
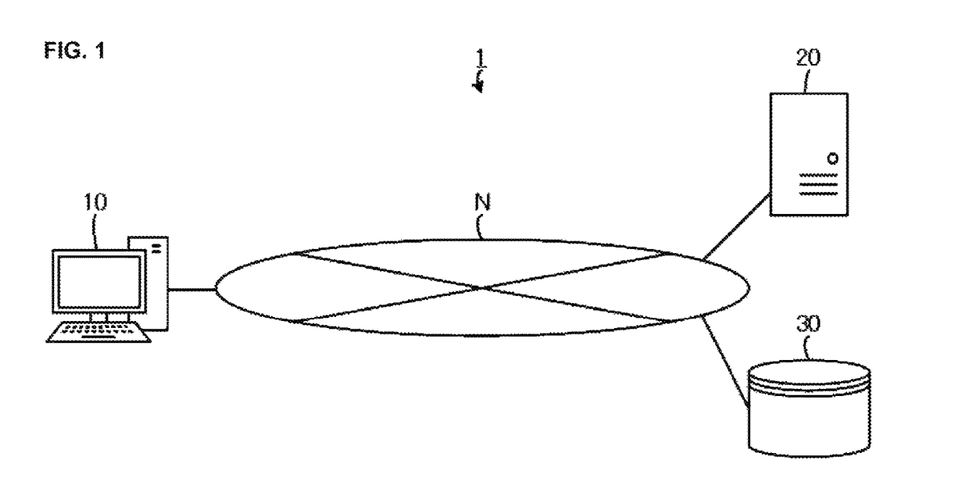
FIG. 1 is an image showing a configurational example of a management system.

As shown in FIG. 1, the information management system 1 is provided with the terminal device 10, the server device 20, and the storage device 30, and these are connected via a network N such as the internet so as to be capable of mutually communicating.

Figure 2:
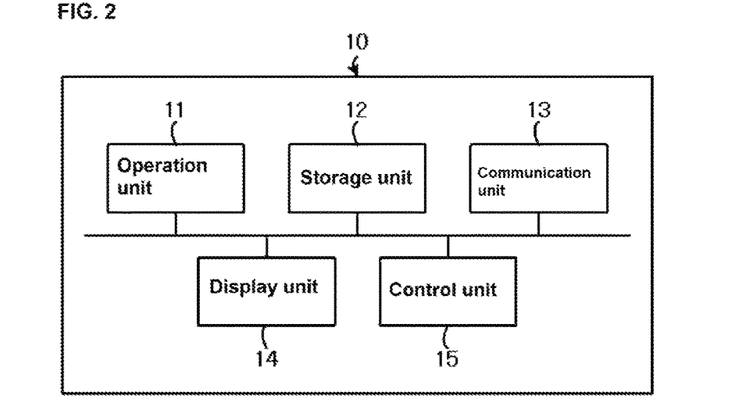
FIG. 2 is a block diagram showing a configurational example of a terminal device.

FIG. 2 is a block diagram showing a configurational example of the terminal device.

The terminal device 10 is installed within a company handling, for example, personal information of customers, and is configured from a general purpose personal computer, a tablet computer, or a smartphone, and the like. As shown in FIG. 2, the terminal device 10 is provided with an operation unit 11, a storage unit (storage) 12, a communication unit 13, a display unit 14, and a control unit (processor) 15, and these are connected via a bus so as to be capable of mutually communicating.

The operation unit 11 is, for example, configured from a keyboard and mouse, or a touch panel, and the like. The operator inputs a login ID (Identifier) and password, or the like using the operation unit 11, and instructs login into the server device 20.

The operator inputs the personal information of a customer using the operation unit 11, and instructs that the personal information that has been input be registered. The personal information thereof includes a plurality of items such as the customer's name, address, telephone number, FAX number, and email address.

The operator inputs any of the plurality of items included in the personal information of the customer using the operation unit 11, and can search the personal information, which includes the items which have been input. The operator also instructs a logout from the server device 20 using the operation unit 11.

The storage unit 12 is, for example, configured from a hard disc drive, or flash memory, or the like, and stores a standard character code table, which is used as a standard, such as the JIS standard character code table.

Here, standard character codes are byte expressions assigned to each of the characters in order to use the characters on a computer. Furthermore, the JIS standard character code is a 2-byte character code, and is commonly called a "full-width character", and a number of "00000" to "65535" (decimal number) is assigned to each character such as English characters, numbers, Chinese characters, hiragana, katakana, and the like. Note that the term "characters" in the present application includes all types of characters such as English characters, numbers, Chinese characters, hiragana, katakana, symbols, and the like.

Note that the standard character code table may be the ASCII (ASCII: American Standard Code for Information Interchange) code table. ASCII code is 1-byte character code, and is commonly referred to as "half-width characters," and a number of "000" to "127" (decimal number) is assigned to each character such as English characters, numbers, and the like.

Furthermore, the storage unit 12 stores a standard font for displaying characters corresponding to the standard character code.

The communication unit 13 is, for example, configured from an NIC (Network Interface Card), or the like, and transmits the login ID and password input by the operation unit 11 to the server device 20 via the network N. Moreover, the communication unit 13 receives converted font transmitted from the server device 20 via the network N.

The communication unit 13 transmits, to the server device 20 via the network N, a standard character code string corresponding to a character string indicating personal information of a customer that has been input with the operation unit 11. Moreover, the communication unit 13 receives, from the server device 20 via the network N, a notification to the effect that registration of a customer's personal information has been completed.

The communication unit 13 transmits, to the server device 20 via the network N, the standard character code string corresponding to the character string indicating the items that were input with the operation unit 11. The communication unit 13 also receives a converted character code string corresponding to the character string indicating the personal information to be transmitted from the storage device 30 via the network N.

The display unit 14 is, for example, configured from a general purpose liquid crystal display device, and displays to the effect that registration of the customer's personal information has been completed. The display unit 14 also displays a character string specified from the converted character code string received by the communication unit 13.

The control unit 15 is, for example, configured from a CPU (Central Processing Unit), ROM (Read Only Memory), and RAM (Random Access Memory), and the like, and the CPU uses the RAM as a work memory, and controls the various operations of the terminal device 10 by executing, as appropriate, a program stored in the ROM.

The control unit 15 responds to an instruction input by the operator using the operation unit 11 to log into the server device 20, and logs into the server device 20 by transmitting, from the communication unit 13 to the server device 20 via the network N, the login ID and password input using the operation unit 11. The control unit 15 receives, from the server device 20 via the network N, the converted font corresponding to the login ID and password transmitted to the server device 20, at the communication unit 13, and sets the information thereof in RAM or the like.

The control unit 15 responds to an instruction for registration of personal information of a customer instructed by the operator using the operation unit 11 while logged in, and requests that the server device 20 register the personal information of the customer by transmitting, from the communication unit 13 to the server device 20 via the network N, the standard character code string corresponding to the character string indicating the personal information of the customer input using the operation unit 11.

The control unit 15 responds to the receipt, at the communication unit 13, of notification to the effect that registration of the personal information of the customer to be transmitted from the server device 20 via the network N has been completed, and displays the gist thereof on the display unit 14.

The control unit 15 responds to an instruction to search the personal information of the customer including items that were input by the operator using the operation unit 11, transmits, from the communication unit 13 to the server device 20 via the network N, the standard character code string corresponding to the character string indicating the personal information items input with the operation unit 11, and thereby requests that the storage device 20 search the personal information of the customer including the items input with the operation unit 11.

The control unit 15 responds to the receipt, at the communication unit 13 from the storage device 30 via the network N, of the converted character code string corresponding to the character string indicating the personal information of the customer including the items that were input with the operation unit 11, and determines whether or not the operator is logged into the server device 20.

If a determination is made that the operator is logged into the server device 20, the control unit 15 uses the converted font set in RAM or the like, and displays, on the display unit 14 the characters corresponding to each converted character code configuring the converted character code string received by the communication unit 13. Through this, the character string indicating the personal information is displayed on the display unit 14.

If a determination is made that the operator is not logged into the server device 20, the control unit 15 uses the standard font stored in the storage unit 12, and displays, on the display unit 14, the characters corresponding to each converted character code configuring the converted character code string received by the communication unit 13. Through this, the character string converted into characters is displayed on the display unit 14.

In response to an instruction to logout from the server device 20 instructed by the operator using the operation unit 11, the control unit logs out from the server device 20, and deletes the converted font set in RAM or the like.

Figure 3:
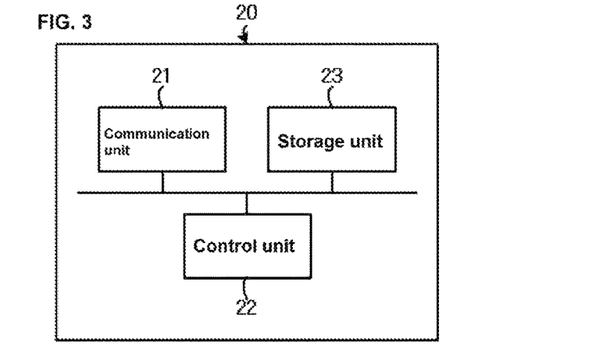
FIG. 3 is a block diagram showing a configurational example of a server device.

FIG. 3 is a block diagram showing a configurational example of the server device.

The server device 20 is, for example, configured from a general purpose server computer, or the like, and as shown in FIG. 3, is provided with a communication unit 21, a storage unit (storage) 22, and a control unit (processor) 23, and these are connected via a bus so as to be capable of mutually communicating.

The communication unit 21 is, for example, configured from an NIC and the like, and receives the login ID and password transmitted from the terminal device 10 via the network N. The communication unit 21 also transmits the converted font to the terminal device 10 via the network N.

The communication unit 21 receives a standard character code string corresponding to a character string indicating personal information of a customer to be transmitted from the terminal device 10 via the network N. The communication unit 21 also transmits to the storage device 30 via the network N, the converted character code string corresponding to the character string indicating the personal information of the customer.

The communication unit 21 receives notification from the storage device 30 via the network N to the effect that registration of personal information of the customer has been completed. The communication unit 21 also transmits, to the terminal device 10 via the network N, a notification to the effect that registration of the personal information of the customer has been completed.

The communication unit 21 receives a standard character code string corresponding to the character string indicating the items of personal information to be transmitted from the terminal device 10 via the network N. The communication unit 21 also transmits to the storage device 30 via the network N, the converted character code string corresponding to the character string indicating the items of personal information.

The storage unit 22 is, for example, configured from a hard disc drive, or the like, and stores a conversion DB (database) 220.

Figure 4:
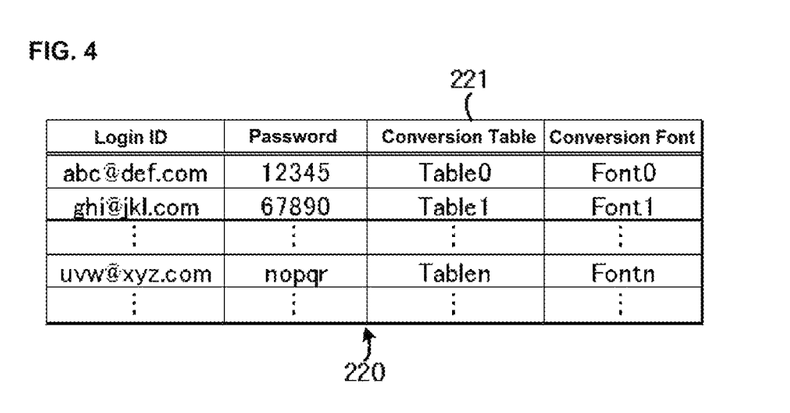
FIG. 4 is an image showing a configurational example of a conversion DB.

FIG. 4 is an image showing a configurational example of a conversion DB.

As shown in FIG. 4, the conversion DB 220 correlates and registers the login ID, password, a conversion table 221, and converted font.

Figure 5:
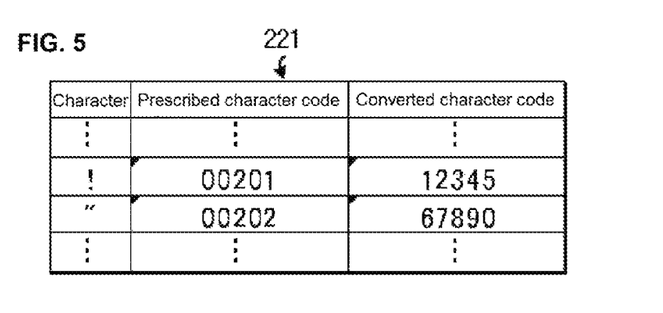
FIG. 5 is an image showing a configurational example of a conversion table.

FIG. 5 is an image showing a configurational example of the conversion table.

As shown in FIG. 5, the conversion table 221 correlates and registers a standard character code and a converted character code for each character. As disclosed by the specification, claims, and drawings of PCT/JP2014/52463, the converted character code is generated using the standard character code table and an encryption key. Note that the specification, claims, and drawings overall of PCT/JP2014/52463 are incorporated as a reference in the present specification.

More specifically, encrypted character strings corresponding to each character are generated by subjecting the standard character code assigned to each character in the standard character code table to a prescribed encryption processing. With the present embodiment, encrypted character strings corresponding to each character are generated by encrypting the standard character code assigned to each character with the Rijndael encryption method using an encryption key assigned, for example, to each terminal device 10 or to each company at which the terminal device 10 is installed.

Note that the encryption method is not limited to the Rijndael encryption method, and another encryption method may be used. For example, elliptic curve cryptography (ECC), Rivest-Shamir-Adleman (RSA) encryption, ElGamal encryption, or other such asymmetric cryptography (public key cryptography) method can be favorably used in the present invention. Moreover, Advanced Encryption Standard (AES) encryption, Data Encryption Standard (DES) encryption, and the like can also be applied in the present invention. Or, a technique other than encryption of the standard character code may be used for conversion in accordance with a prescribed algorithm. Furthermore, the encryption method applied for each terminal device 10 or for each company at which the terminal device 10 is installed may be different.

Figure 6:
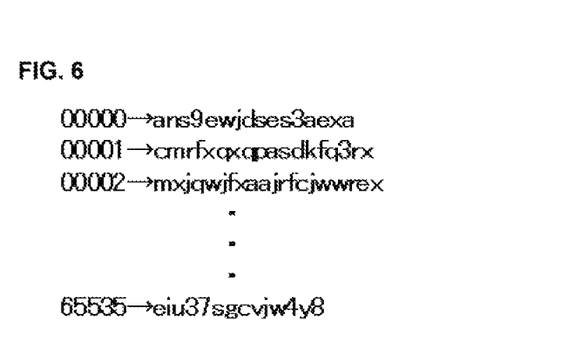
FIG. 6 is an explanatory diagram showing an example of character code.

As shown in FIG. 6, as one example, an encryption key of "R28djaowis912jaas0slwodkqod3m010" is used to encrypt the standard character code "00000" with the Rijndael encryption method, and the encrypted character string "ans9ewjdses3aexa" is generated. Moreover, the encrypted character string "cmrfxqxqpasdkfq3rx" is generated from the standard character code "00001", the encrypted character string "mxjqwjfxaajrfcjwwrex" is generated from the standard character code "00002", . . . and the encrypted character string "eiu37sgcvjw4y8" is generated from the standard character code "65535", Next, each of the characters corresponding to the encrypted character string is rearranged by rearranging the generated encrypted character string in alphabetic order. With the example shown in FIG. 6, rearrangement is done in the order of the encrypted character string "ans9ewjdses3aexa" generated from the standard character code "00000", the encrypted character string "cmrfxqxqpasdkfq3rx" generated from the standard character code "00001", the encrypted character string "eiu37sgcvjw4y8" generated from the standard character code "65535", and the encrypted character string "mxjqwjfxaajrfcjwwrex" generated from the standard character code "00002". Note that the order of the encrypted character strings can be optionally changed, and may be predetermined, and for example, the order thereof can be generated in accordance with a prescribed algorithm using the encryption key.

A number of "00000" to "65535" (decimal number) is sequentially reassigned to each of the characters that has been rearranged in accordance with alphabetical order of the encrypted character strings, and this is used as the converted character code. Furthermore, a conversion table 221 is produced by correlating and registering the standard character code and converted character code with each character.

The converted font is used for displaying characters corresponding to the converted character code.

The control unit 23 shown in FIG. 3 is, for example, configured from a CPU, ROM, RAM, and the like, the CPU uses the RAM as work memory, and the control unit 23 controls the various operations of the server device 20 by executing, as appropriate, a program stored in ROM.

The control unit 23 determines whether or not the login ID and password received by the communication unit 21 are registered in the conversion DB 220. If the control unit determines that the login ID and password are registered, the control unit 23 authenticates the login of the terminal device 10. The control unit 23 also transmits, from the communication unit 21 to the terminal device 10 via the network N, the converted font correlated with the login ID and password and registered in the conversion DB 220.

In response to a request by the terminal device 10 to register the personal information of a customer during login, the control unit 23 specifies, from the conversion table 221, the respective converted character codes corresponding to each standard character code configuring the standard character code string corresponding to the character string indicating the personal information of the customer received by the communication unit 21, and generates the converted character code string corresponding to the character string indicating the personal information of the customer. Furthermore, the control unit 23 also transmits to the storage device 30 via the network N, the generated converted character code string corresponding to the character string indicating the personal information of the customer.

In response to the receipt from the storage device 30 via the network N of notification to the effect that registration of the personal information of the customer has been completed, the control unit 23 transmits notification of such to the terminal device 10 via the network N.

In response to a request by the terminal device 10 to search the personal information of the customer, the control unit 23 specifies, from the conversion table 221, the respective converted character codes corresponding to each standard character code configuring the standard character code string corresponding to the character string indicating the personal information items received by the communication unit 21, and generates the converted character code string corresponding to the character string indicating the personal information item. The control unit 23 also transmits, from the communication unit 21 to the storage device 30 via the network N, the generated converted character code string corresponding to the character string indicating the personal information item.

Figure 7:
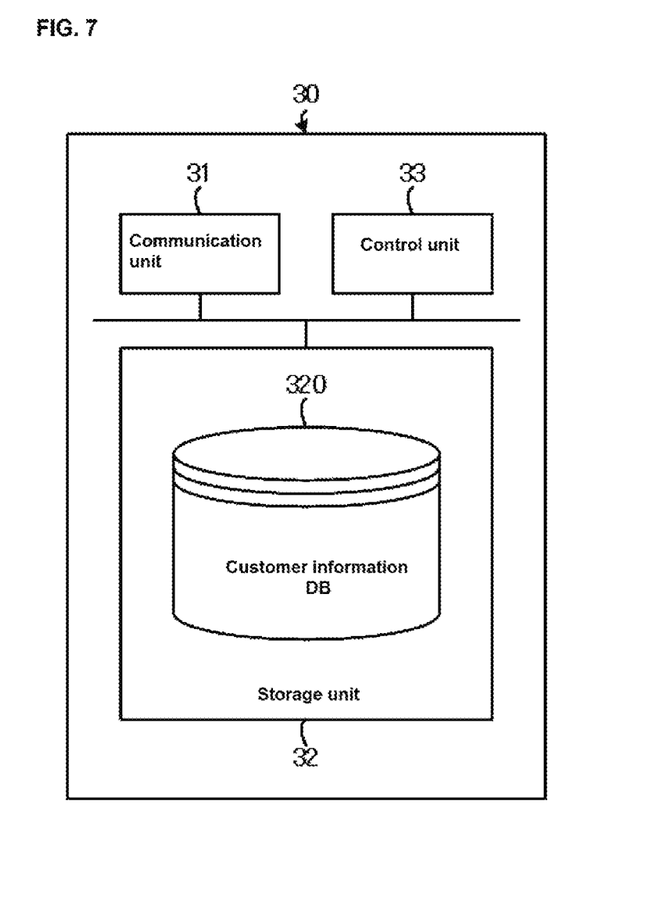
FIG. 7 is a block diagram showing a configurational example of a storage device.

FIG. 7 is a block diagram showing a configuration example of the storage device.

The storage device 30 is configured, for example, from a general purpose server computer or the like, and as shown in FIG. 7, is provided with a communication unit 31, a storage unit (storage) 32, and a control unit (processor), and these are connected via a bus so as to be capable of mutually communicating.

The communication unit 31 is configured, for example, from an NIC and the like, and receives the converted character code string corresponding to the character string indicating the personal information of the customer to be transmitted from the server device 20 via the network N. The communication unit 31 also transmits, to the server device 20 via the network N, a notification to the effect that registration of the personal information of the customer has been completed.

The communication unit 31 receives the converted character code string corresponding to the character string indicating the personal information item transmitted from the server device 20 via the network N. Moreover, the communication unit 31 also transmits, to the terminal device 10 via the network N, the converted character code string corresponding to the character string indicating the personal information of the customer.

The storage unit 32 is configured, for example, from a hard disc drive, and the like, and stores a personal information DB 320. The personal information DB 320 registers, as is, the converted character code string corresponding to the character string indicating the personal information of the customer.

The control unit 33 is configured, for example, from a CPU, ROM, RAM, and the like, and the CPU uses RAM as work memory, and the control unit 33 controls the various operations of the storage device 30 by executing, as appropriate, a program stored in ROM.

In response to the receipt by the communication unit 31 of the converted character code string corresponding to the character string indicating the personal information of the customer to be transmitted from the server device 20 via the network N, the control unit 23 registers, as is in the personal information DB 320, the received converted character code string corresponding to the character string indicating the personal information of the customer.

In response to reception at the communication unit 31 of the converted character codes string corresponding to the character string indicating a personal information item to be transmitted from the server device 20 via the network N, the control unit 33 searches from the personal information DB 320 for a converted character code string corresponding to the character string indicating the personal information item that was received. Next, the control unit 33 reads, from the personal information DB 320, the converted character code string corresponding to the character string indicating the personal information of the customer containing the converted character code string that was searched. Furthermore, the control unit 33 also transmits, from the communication unit 31 to the terminal device 10 via the network N, the converted character code string corresponding to the character string indicating the personal information of the customer that was read.

Next, operations by the information management system 1 provided with the abovementioned configuration are described with reference to the drawings.

In response to an instruction to login to the server device 20 instructed by the operator using the operation unit 11, the control unit 15 of the terminal device 10 transmits, from the communication unit 13 to the server device 20 via the network N, the login ID and password input using the operation unit 11.

The control unit 23 of the server device 20 receives, at the communication unit 21, the login ID and password transmitted from the terminal device 10 via the network N.

Next, the control unit 23 determines whether or not the login ID and password received by the communication unit 21 are registered in the conversion DB 220.

If it is determined that the login ID and password are registered, the control unit 23 authenticates the login of the terminal device 10.

Furthermore, the control unit 23 transmits, from the communication unit 21 to the terminal device 10 via the network N, the converted font which is correlated to the login ID and password and registered in the conversion DB 220.

The control unit 15 of the terminal device 10 receives, at the communication unit 13, the converted character code table transmitted from the server device 20 via the network N, and sets the table in RAM or the like.

Furthermore, in response to an input of personal information of the customer by the operator using the operation unit 11 while logged in, and an instruction to register the personal information of the customer, the information management system 1 begins personal information registration processing.

Figure 8:
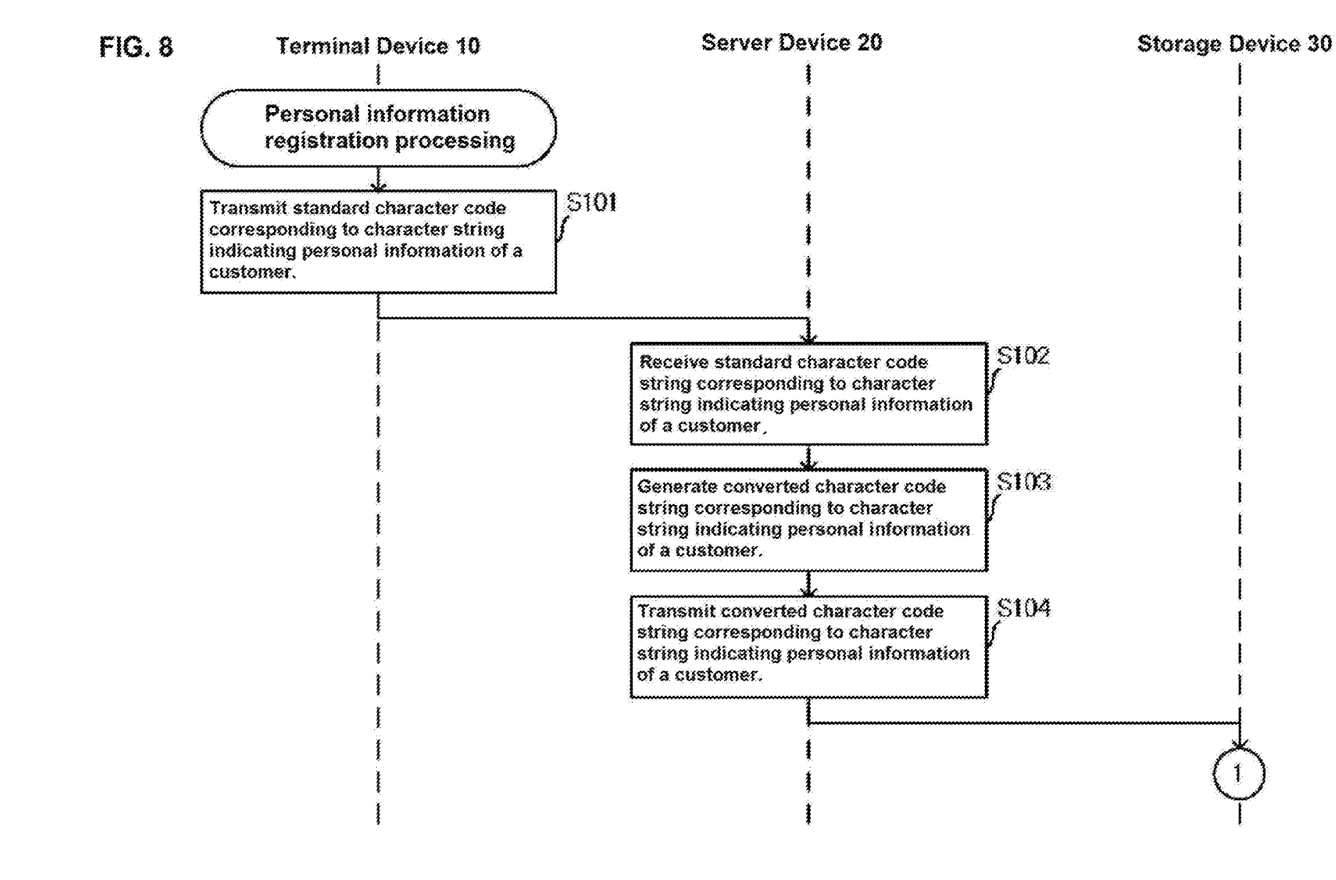
FIG. 8 is a flow chart showing an example of personal information registration processing.
Figure 9:
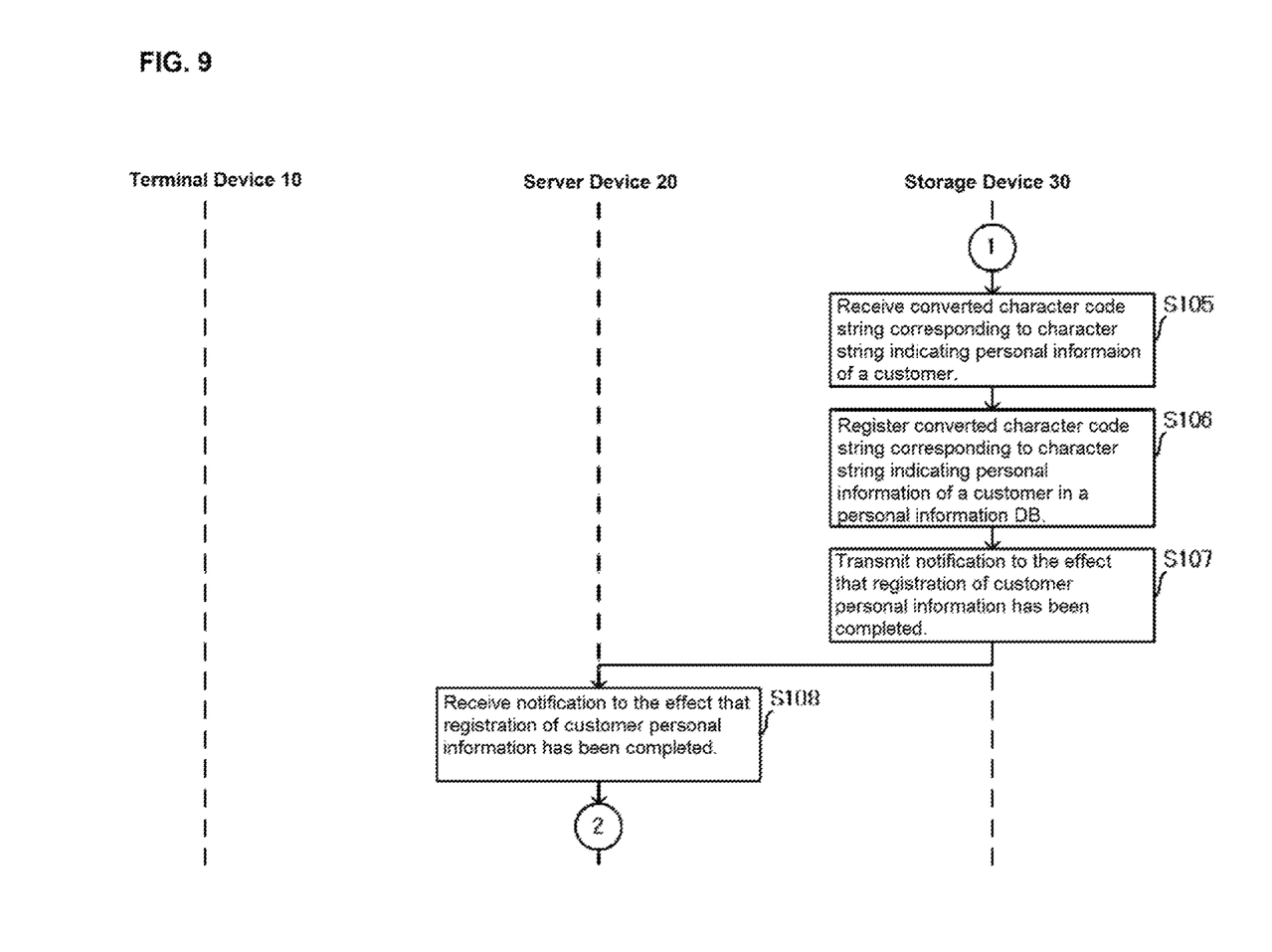
FIG. 9 is a flow chart showing an example of personal information registration processing.
Figure 10:
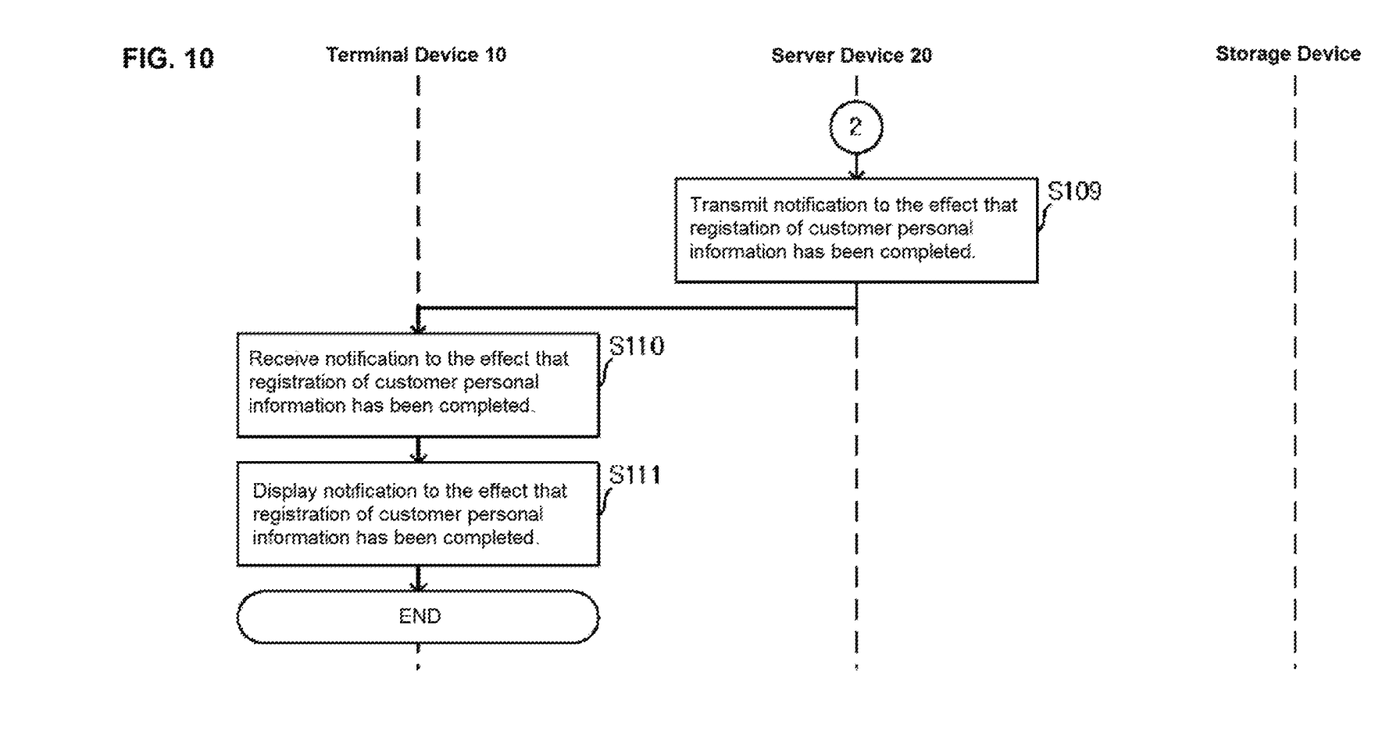
FIG. 10 is a flow chart showing an example of personal information registration processing.

FIG. 8 to FIG. 10 are flow charts showing examples of personal information registration processing.

With the personal information registration processing, as shown in FIG. 8, first, the control unit 15 of the terminal device 10 transmits, from the communication unit 13 to the server device 20 via the network N, the standard character code string corresponding to the character string indicating the personal information of the customer input by the operation unit 11 (step S101).

The control unit 23 of the server device 20 receives, at the communication unit 21, the standard character code string corresponding to the character string indicating the personal information to be transmitted from the terminal device 10 via the network N (step S102).

Next, the control unit 23 specifies, from the conversion table 221, the respective converted character codes corresponding to each character code configuring the standard character code string corresponding to the character string indicating the personal information of the customer received by the communication unit 21, and generates a converted character code string corresponding to the character string indicating the personal information of the customer (step S103).

Furthermore, the control unit 23 transmits, to the storage device 30 via the network N, the converted character code string corresponding to the character string indicating the personal information of the customer, the string thereof being generated in step S103 (step S104).

As shown in FIG. 9, the control unit 33 of the storage device 30 receives, at the communication unit 31, the converted character code string corresponding to the character string indicating the personal information of the customer to be transmitted from the server device 20 via the network N (step S105).

Next, the control unit 33 registers, as is in the personal information DB 320, the converted character code string corresponding to the character string indicating the personal information of the customer received at the communication unit 31 (step S106).

Furthermore, the control unit 33 transmits, from the communication unit 31 via the network N, a notification to the effect that registration of the personal information of the customer has been completed (step S107).

The control unit 23 of the server device 20 receives, at the communication unit 21, the notification to the effect that registration of the personal information of the customer to be transmitted from the storage device 30 via the network N has been completed (step S108). Furthermore, as shown in FIG. 10, the control unit 23 transmits, from the communication unit 21 via the network N, the notification to the effect that registration of the personal information of the customer has been completed (step S109).

The control unit 15 of the terminal device 10 receives, at the communication unit 21, the notification to the effect that registration of the personal information of the customer to be transmitted via the network N from the server device 20 has been completed (S110).

Furthermore, the control unit 15 displays, on the display unit 14, information indicating that registration of the personal information of the customer has been completed (step S111), and ends personal information registration processing.

Moreover, in response to an input of any item of the plurality of items contained in the personal information of the customer through operation by the operator of the operation unit 11, and an instruction to search the personal information of the customer including the item that was input, the control unit 15 of the terminal device 10 begins personal information display processing.

Figure 11:
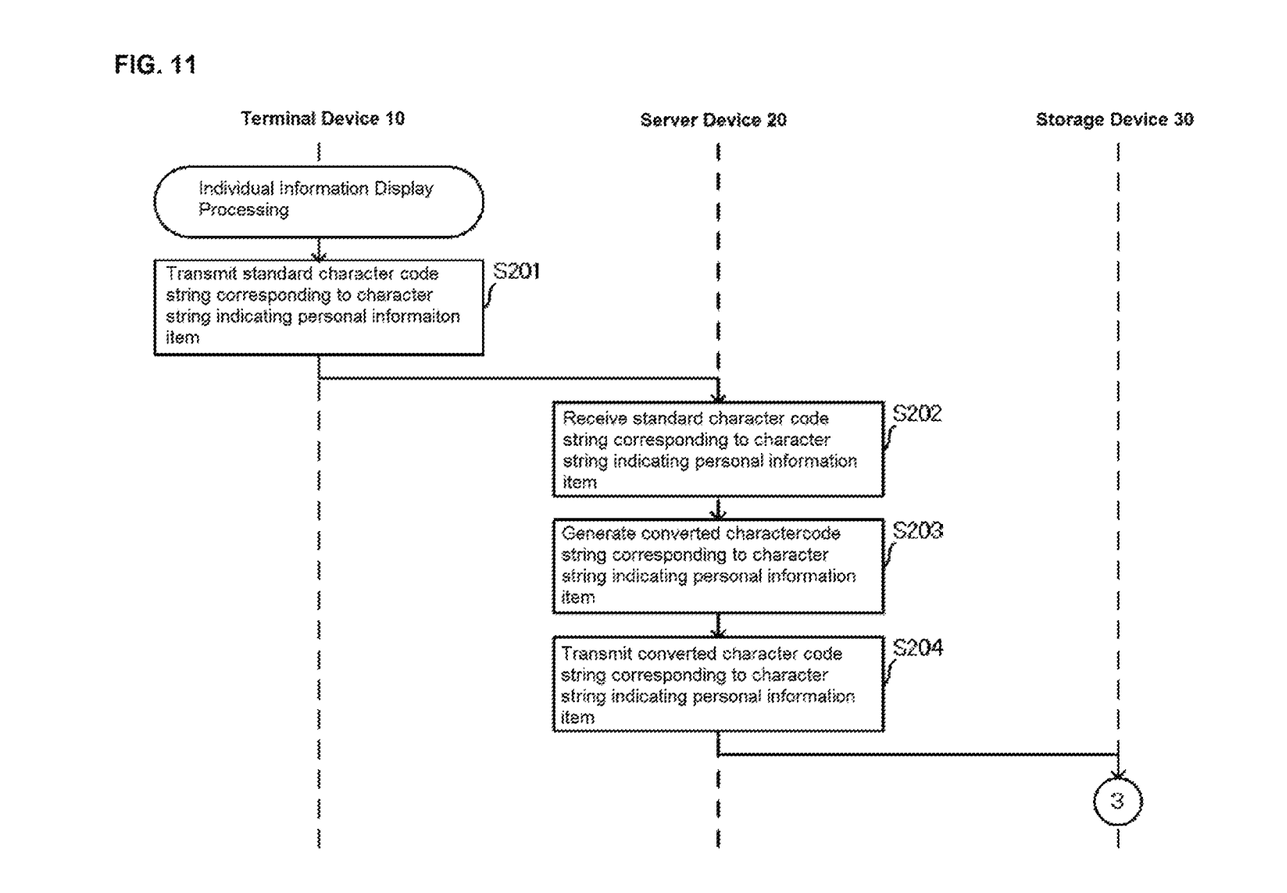
FIG. 11 is a flow chart showing an example of personal information display processing.
Figure 12:
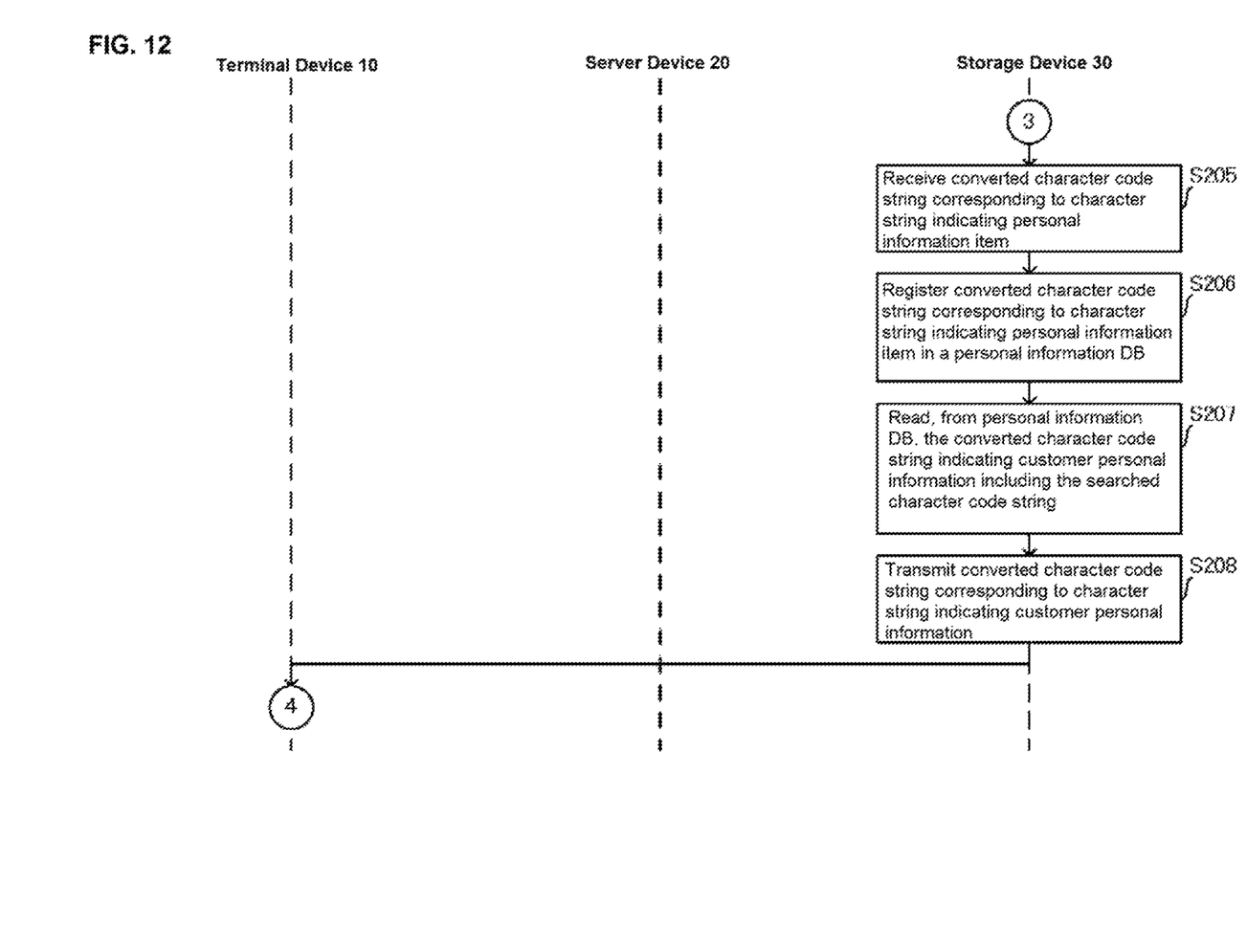
FIG. 12 is a flow chart showing an example of personal information display processing.
Figure 13:
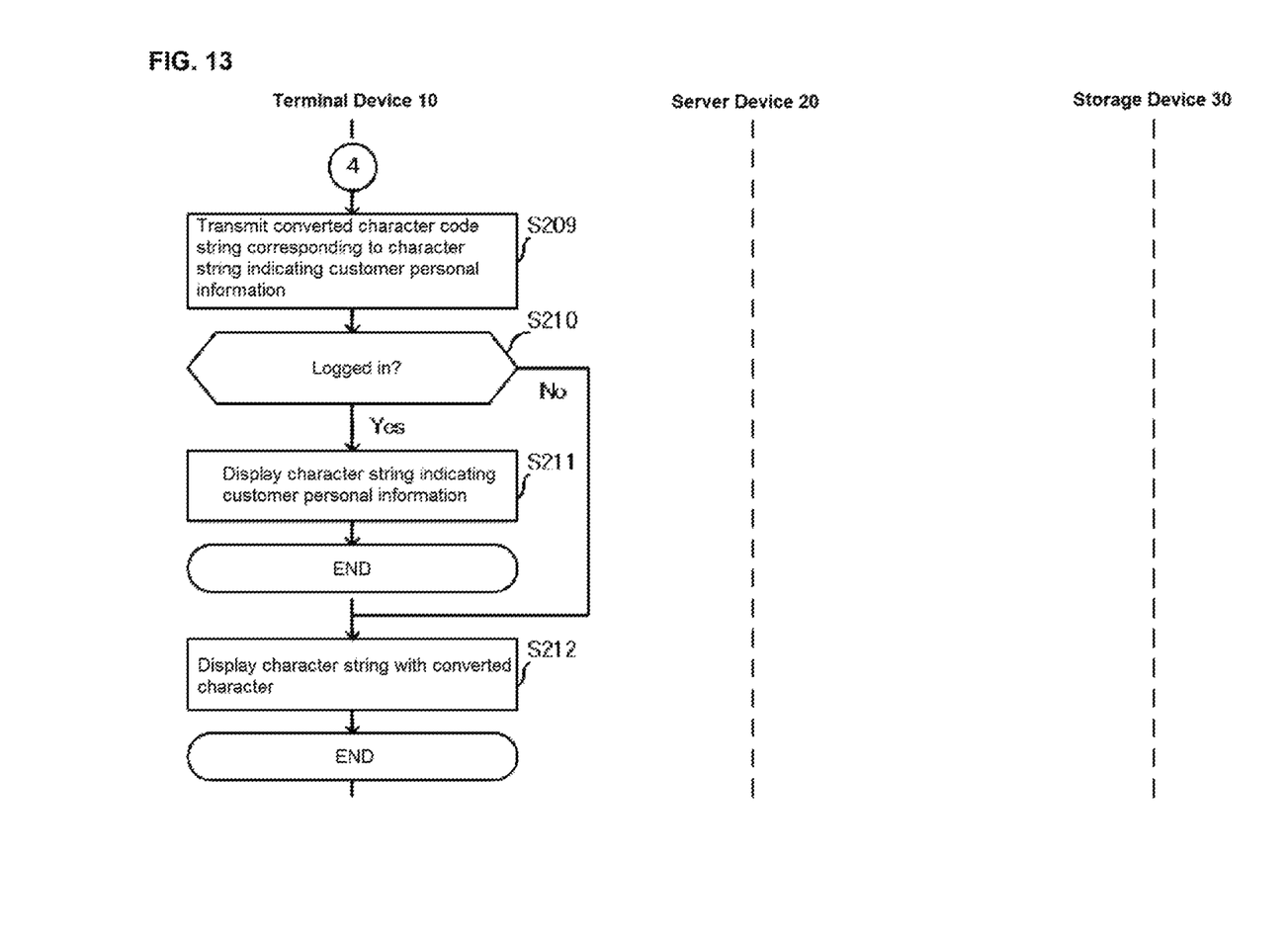
FIG. 13 is a flow chart showing an example of personal information display processing.

FIG. 11 to FIG. 13 are flow charts showing examples of personal information display processing.

As shown in FIG. 11, with personal information display processing, the control unit 15 of the terminal device 10 transmits, from the communication unit 13 to the server device 20 via the network N, the standard character code string corresponding to the character string indicating the personal information item that was input using the operation unit 11 (step S201).

The control unit 23 of the server device 20 receives the standard character code string corresponding to the character string indicating the personal information item to be transmitted from the terminal device 10 via the network N transmit (step S202).

Next, the control unit 23 specifies from the conversion table 221 each converted character code corresponding to each standard character code configuring the standard character code string corresponding to the character string indicating the personal information item received by the communication unit 21, and generates a converted character code string corresponding to the character string indicating the personal information item (step S203).

Furthermore, the control unit 23 transmits, from the communication unit 21 to the storage device 30 via the network N, the converted character code string corresponding to the character string indicating the personal information item generated at S203 (step S204).

As shown in FIG. 12, the control unit 33 of the storage device 30 receives, at the communication unit 31, the converted character code string corresponding to the character string indicating the personal information item to be transmitted from the server device 20 via the network N (step S205).

Next, the control unit 33 searches from the personal information DB 320 for the converted character code string corresponding to the character string indicating the personal information item received at the communication unit 31 (step S206).

Next, the control unit 33 reads, from the personal information DB 320, the converted character code string corresponding to the character string indicating the personal information of the customer containing the converted character code string that was searched in step S206 (step S207).

Furthermore, the control unit 33 transmits, from the communication unit 31 to the terminal device 10 via the network N, the converted character code string corresponding to the character string indicating the personal information of the customer that was read in step S207 (step S208).

As shown in FIG. 13, the control unit 15 of the terminal device 10 receives, at the communication unit 13, the converted character code string corresponding to the character string indicating the personal information of the customer to be transmitted from the storage device 30 via the network N (step S209).

Next, the control unit 15 determines whether or not the user is logged into the server device 20 (step S210).

If the control unit 15 determines that the user is logged into the server device 20 (Yes at step S210), the control unit 15 uses the converted font set in RAM or the like, displays, on the display unit 14, the characters corresponding to each converted character code configuring the converted character code string received by the communication unit 13 (step S211), and ends personal information display processing. Through this, the character string indicating the personal information is displayed on the display unit 14.

If the control unit 15 determines that the user is not logged into the server device 20 (No at step S210), the control unit 15 uses the stipulated font stored in the storage unit 12, displays, on the display unit 14, the characters corresponding to each converted character code configuring the converted character code string received at the communication unit 13 (step S212), and ends personal information display processing. Through this, a character string converted to characters is displayed on the display unit 14.

As described above, with the information management system 1 of the present embodiment, the server device 20 is provided with a control unit (processor) 23, and a storage unit (storage) 22 for correlating and storing a prescribed character code and a converted character code of a type that differs from the prescribed character code. Moreover, the server device 20 is connected, via the network N, to the terminal device 10, which receives, via the network N, the converted character code string corresponding to the character string indicating the personal information of the customer stored in the storage device 30.

In response to reception from the terminal device 10 of the prescribed character code string corresponding to the character string indicating the item contained in the personal information of the customer, the control unit 23 generates a converted character code string corresponding to the character string indicating the personal information item by converting the prescribed character codes contained in the prescribed character code string to respectively corresponding converted character codes. The control unit 23 also instructs the storage device 30 to transmit, to the terminal device 10, the converted character code string corresponding to the character string indicating the personal information of the customer containing the character string indicating the personal information item corresponding to the converted character code string.

In this manner, the converted character code string containing the converted character code for which the type differs from that of the prescribed character code is stored in the storage device 30 rather than the prescribed character code string transmitted by the terminal device 10, and therefore the information management system 1 can securely manage the personal information of the customer. Moreover, the information management system 1 converts the prescribed character code string received from the terminal device 10 to a converted character code string and transmits the converted character code string to the storage device 30, and thereby the converted character code string corresponding to the character string indicating the personal information of the customer can be transmitted to the terminal device 10.

Moreover, the control unit 23 transmits, via the network N, converted font for displaying the characters corresponding to the converted character code to the terminal device 10 which satisfies prescribed conditions, namely a terminal device 10 that is logged into the server device 20. If the terminal device 10 is logged into the server device 20, the terminal device 10 uses the converted font that is transmitted from the server device 20, and displays the character string indicating the personal information of the customer. On the other hand, if the terminal device 10 is not logged into the server device 20, the terminal device 10 displays a character string converted into characters differing from the character string indicating the personal information of the customer.

In this manner, the terminal device 10 uses the converted font to only display a character string corresponding to the converted character code string, and thereby the converted character code string does not decode to the prescribed character code string. Therefore, if the converted character code string corresponding to the character string indicating the personal information of the customer is moved to another environment not having the converted font, a character string converted to characters differing from the character string showing the personal information of the customer is displayed. Furthermore, if the converted character code string corresponding to the character string indicating the personal information of the customer is output by a method other than display such as printing, a character string converted to characters differing from the character string indicating the personal information of the customer is output. In this manner, the personal information of the customer can be output in a readable state only when displayed by a terminal device 10 having the converted font, and therefore the information management system 1 can more securely manage the personal information of the customer. Moreover, the information management system 1 can reduce the load of the terminal device 10 because the converted character code string is not decoded to the prescribed character code string.

In addition, the storage unit 22 also stores a conversion DB 220 for correlating and registering the login ID and password for authenticating a login of the terminal device 10, the conversion table 221, and the converted font. Furthermore, the conversion table correlates the standard character codes and converted character codes with each character and registers the information thereof. In other words, the storage unit 22 correlates and registers the terminal device 10, the converted character code, and the converted font. The control unit 23 also converts the standard character code to converted character code corresponding to the terminal device 10 that transmitted the standard character code string containing the standard character code. Furthermore, the control unit 23 transmits the converted font corresponding to the terminal device 10 to the logged in terminal device 10.

In this manner, the server device 20 converts the standard character code to a different converted character code for each terminal device 10, or in other words, for each authority of an operator that can log in. Moreover, the server device 20 can transmit, to the logged in terminal device 10, the converted font corresponding to the converted character code for which the standard character code transmitted by the terminal device 10 was converted. Through this, the information management system 1 can more securely manage the personal information of the customer.

Moreover, if the prescribed conditions are no longer met, or in other words, if a log out from the server device 20 occurs, the terminal device 10 destroys the converted font transmitted from the server device 20.

Through this, even if the converted character code string corresponding to the character string indicating the personal information of the customer transmitted from the server device 20 is saved, if not logged in, the terminal device 10 cannot form the converted character code string into a readable state. Therefore, the information management system 1 can more securely manage the personal information of the customer.

Moreover, the control unit 23 generates a converted character code string corresponding to the character string indicating the personal information of the customer by converting the standard character codes contained in the standard character code string corresponding to the character string indicating the personal information of the customer to the respectively corresponding converted character codes. Furthermore, the control unit 23 instructs the storage device 30 to store the character string indicating the personal information of the customer in the storage device 30.

In this manner, the server device 20 stores, in the storage device 30, the prescribed character code string corresponding to the character string indicating the personal information of the customer in a state of being converted to a converted character code string. Therefore, the information management system 1 can more securely manage the personal information of the customer.

Moreover, the converted character code is generated by respectively encrypting standard character codes corresponding to each character to produce an encrypted character string, rearranging the encrypted character string in a prescribed order, and then sequentially assigning numeric values to each character corresponding to the encrypted character string that has been rearranged.

In this manner, the converted character code is generated by rearranging standard character codes with a method that is difficult to decode. Therefore, the information management system 1 can more securely manage the personal information of the customer.

Note that the converted character codes corresponding to the terminal device 10, namely to each of the authorities of the operators who can log in, may be generated by differing at least one of the encryption key, encryption method, and method for rearranging the encrypted character string for each authority of operators who can log in.

Also note that the present invention is not limited to the abovementioned embodiment, and various transformations and applications are possible. Modified aspects of the abovementioned embodiment which can be applied in the present invention are described below.

The abovementioned embodiment was explained with the conversion table 221 and the converted font being generated in advance. However, the present invention is not limited thereto, and the conversion table 221 and the converted font may be generated each time a standard character code string is received from the terminal device 10.

In this case, the storage unit 22 stores the standard character code table in the same manner as the storage unit 12. Moreover, the conversion DB 220 correlates and registers the login ID, password, and encryption key.

In response to reception at the communication unit 21 of the standard character code string to be transmitted from the terminal device 10 via the network N, the control unit 23 uses the encryption key stored in the conversion DB 220 to encrypt the standard character codes assigned to each character of the standard character code table with the Rijndael encryption method for example, and thereby generates an encrypted character string corresponding to each character.

Next, the control unit 23 rearranges each of the characters corresponding to the encrypted character string by rearranging, in alphabetical order, the encrypted character string that was generated. After this, the control unit 23 sequentially reassigns a number of from "00000" to "65535" (decimal number) to each of the characters of the encrypted character string, the characters thereof being rearranged in alphabetical order, and this is then used as the converted character code. Furthermore, the control unit 23 may generate the conversion table 221 by correlating the standard character code and converted character code with each character and registering the correlated information thereof.

In addition, the converted font may also be generated from the conversion table 221 each time a standard character code string is received from the terminal device 10.

By generating the conversion table 221 and the converted font each time a standard character code string is received from the terminal device in this manner, even if the encryption key becomes known by a third party, as long as the method for generating the converted character code is not known, the converted character code string corresponding to the character string indicating the personal information of the customer cannot be decoded. Through this, the information management system 1 can more securely manage the personal information of the customer.

With the abovementioned embodiment, the converted character code was explained as code that is generated by respectively encrypting the standard character codes corresponding to each character to generate an encrypted character string, rearranging the encrypted character string in a prescribed order, and then sequentially assigning numeric values to each of the characters corresponding to the encrypted character string that has been rearranged. However, the present invention is not limited thereto, and of the characters corresponding to the converted character code, for example, all of the numbers "0" to "9" may be the same symbol or the like. When this is done, speculating the characters corresponding to the converted character code becomes more difficult, and therefore the information management system 1 can more securely manage the personal information of the customer.

With the abovementioned embodiment, the server device 20 and the storage device 30 were explained as separate devices connected via the network N, but the present invention is not limited thereto, and may be configured as an integrated device.

Moreover, information which can be more securely managed by the information management system 1 is not limited to personal information of a customer, and may be any optional information.

In the abovementioned embodiment, the program executed by the CPUs of the control units 15, 23, and 33 was stored in advance in ROM or the like. However, the present invention is not limited thereto, and may function as the terminal device 10, server device 20, and storage device 30 according to the abovementioned embodiment by applying a program for executing the above-described processing to an existing general-purpose computer, tablet computer, smartphone, server computer, and the like.

The method for providing this type of program is optional, and for example, the program may be stored in a recording medium (flexible disc, CD (Compact Disc)-ROM, DVD (Digital Versatile Disc)-ROM, etc.) which can be read by a computer, and distributed, or the program may be stored in a storage unit on a network such as the Internet, and provided by downloading the program thereof.

Moreover, if the abovementioned processing is shared between the OS (Operating System) and an application program, or is executed by cooperation between the OS and the application program, the configuration may be such that only the application program is stored in the recording medium or storage unit. Moreover, the program may be superimposed on carrier waves, and distributed via a network. For example, the abovementioned program may be posted on a bulletin board (BBS: Bulletin Board System) on a network, and the program may then be distributed via a network. Furthermore, the configuration may be such that the abovementioned program can be executed by starting up the program, and then executing it in the same manner as other application programs under the control of the OS.

Note that various embodiments and modifications of the present invention are possible as long as said embodiments and modifications do not depart from the broad spirit and scope of the present invention. Moreover, the above-described embodiment was described for the purpose of describing one embodiment of the present invention, and does not limit the scope of the present invention.

What is claimed is:

1. A server device comprising a storage unit for correlating and storing a prescribed character code and a converted character code of a different type than the prescribed character code and a processor, said server device being connected via a network to a terminal device for receiving through a communication unit, via the network, a converted character code string corresponding to a personal information of a customer stored in a storage device,
    wherein in response to the reception through the communication unit of the server device, from the terminal device via the network, of a prescribed character code string corresponding to a customer's name, address, telephone number, FAX number, and email address contained in the personal information of the customer, the processor is configured for:
    converting the prescribed character code contained in the prescribed character code string to the respectively corresponding converted character code, and thereby generating the converted character code string corresponding to the customer's name, address, telephone number, FAX number, and email address; and
    instructing the storage device to transmit the converted character code string corresponding to the personal information of the customer containing the converted character code string corresponding to the customer's name, address, telephone number, FAX number, and email address to the terminal device;
    wherein the processor is further configured to transmit, via the network, a font for displaying characters corresponding to the converted character code to the terminal device satisfying prescribed conditions, and wherein:
    when the prescribed conditions are satisfied, the terminal device is configured to use the font transmitted from the server device to display the personal information of the customer; and
    when the prescribed conditions are not satisfied, the terminal device displays a character string differing from the personal information of the customer.

2. The server device according to claim 1, wherein the storage unit is configured to correlate and store the terminal device, the converted character code, and the font, and wherein the processor is configured for:
    converting the prescribed character code to the converted character code corresponding to the terminal device that transmitted the prescribed character code string containing the prescribed character code, and transmitting the font stored in the storage in association with the terminal device to the terminal device satisfying the prescribed conditions.

3. The server device according to claim 1, wherein the terminal device is further configured to destroy the font transmitted from the server device if the prescribed conditions are not satisfied.

4. The server device according to claim 1, wherein the processor is further configured for:
   converting the prescribed character code contained in the prescribed character code string corresponding to the personal information of the customer to the respectively corresponding converted character code, and thereby generating the converted character code string corresponding to the personal information of the customer, and
   instructing the storage device to store the converted character code string corresponding to the personal information of the customer.

5. The server device according to claim 1, wherein the converted character code is generated by respectively encrypting prescribed character code corresponding to each character to generate an encrypted character string, rearranging the encrypted character string in a prescribed order, and sequentially assigning a numeric value to each character corresponding to the rearranged encrypted character string.

6. A method for managing information through a server device comprising a storage unit for correlating and storing a prescribed character code and a converted character code of a different type than the prescribed character code and a processor, said server device being connected via a network to a terminal device for receiving through a communication unit, via the network, a converted character code string corresponding to a personal information of a customer stored in a storage device, wherein in response to the reception through the communication unit of the server device, from the terminal device, of a prescribed character code string corresponding to a customer's name, address, telephone number, FAX number, and email address contained in the personal information of the customer, the method being performed by the processor and comprising the steps of:
   converting the prescribed character code contained in the prescribed character code string to the respectively corresponding converted character code, and thereby generating the converted character code string corresponding to the customer's name, address, telephone number, FAX number, and email address;
   instructing the storage device to transmit the converted character code string corresponding to the personal information of the customer containing the converted character code string corresponding to the customer's name, address, telephone number, FAX number, and email address to the terminal device; and
   transmitting, via the network, a font for displaying characters corresponding to the converted character code to the terminal device satisfying prescribed conditions, and wherein:
   when the prescribed conditions are satisfied, the terminal device is configured to use the font transmitted from the server device to display the personal information of the customer; and
   when the prescribed conditions are not satisfied, the terminal device displays a character string differing from the personal information of the customer.

7. A computer program product for managing information through a server device, the server device comprising a storage unit for correlating and storing a prescribed character code and a converted character code of a different type than the prescribed character code and being connected via a network to a terminal device for receiving through a communication unit a converted character code string corresponding to a personal information of a customer stored in a storage device, the computer program product comprising instructions, encoded in a non-transitory computer readable medium, for causing the processor of the server device, in response to the reception by the communication unit of a prescribed character code string corresponding to a customer's name, address, telephone number, FAX number, and email address contained in the personal information of the customer from the terminal device, to perform operations of:
   converting the prescribed character code contained in the prescribed character code string to the respectively corresponding converted character code, and thereby generating the converted character code string corresponding to the customer's name, address, telephone number, FAX number, and email address; and
   instructing the storage device to transmit the converted character code string corresponding to the personal information of the customer containing the converted character code string corresponding to the customer's name, address, telephone number, FAX number, and email address to the terminal device;
   wherein the processor is further configured to transmit, via the network, a font for displaying characters corresponding to the converted character code to the terminal device satisfying prescribed conditions, and wherein:
   when the prescribed conditions are satisfied, the terminal device is configured to use the font transmitted from the server device to display the personal information of the customer; and
   when the prescribed conditions are not satisfied, the terminal device displays a character string differing from the personal information of the customer.

* * * * *